United States Patent
Tsukamoto et al.

(10) Patent No.: US 9,525,768 B2
(45) Date of Patent: Dec. 20, 2016

(54) COMMUNICATION APPARATUS AND CONTROL METHOD THEREOF

(71) Applicant: CANON KABUSHIKI KAISHA, Tokyo (JP)

(72) Inventors: Nobuyuki Tsukamoto, Tokyo (JP); Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 14/561,764

(22) Filed: Dec. 5, 2014

(65) Prior Publication Data
US 2015/0163337 A1 Jun. 11, 2015

(30) Foreign Application Priority Data
Dec. 9, 2013 (JP) .................. 2013-254488

(51) Int. Cl.
*H04B 5/00* (2006.01)
*H04M 1/725* (2006.01)
*H04W 4/00* (2009.01)
*H04W 4/18* (2009.01)
*G06F 9/445* (2006.01)
*H04W 88/06* (2009.01)

(52) U.S. Cl.
CPC ........ *H04M 1/7253* (2013.01); *G06F 9/44505* (2013.01); *H04W 4/008* (2013.01); *H04W 4/18* (2013.01); *H04W 88/06* (2013.01)

(58) Field of Classification Search
CPC ... H04B 5/0031; H04B 5/0037; H04B 5/0056; H04M 1/7253; H04W 4/008; H04W 4/18; H04W 88/06; G06F 9/44505
See application file for complete search history.

(56) References Cited

U.S. PATENT DOCUMENTS

2011/0254687 A1* 10/2011 Arponen ........... H04M 1/72525
  340/540
2012/0210233 A1   8/2012 Davis et al.
2013/0314334 A1  11/2013 Leica et al.

FOREIGN PATENT DOCUMENTS

JP   2013-051717 A   3/2013
WO   2004003801 A1   1/2004

OTHER PUBLICATIONS

Search Report issued on May 29, 2015, which is enclosed, that issued in the corresponding European Patent Application No. 14003816.7.

* cited by examiner

*Primary Examiner* — Nguyen Vo
(74) *Attorney, Agent, or Firm* — Cowan, Liebowitz & Latman, P.C.

(57) ABSTRACT

A communication apparatus comprises a holding unit, a reception unit, and a transmission unit. The transmission unit can transmit both first application activation information and second application activation information that are the activation information held in the holding unit to an external apparatus which has transmitted the request, regardless of whether the request received by the reception unit is a request from the first external apparatus or from the second external apparatus, and the first application activation information is defined by a format compatible with a first control program, and the second application activation information is defined by a format compatible with a second control program.

17 Claims, 8 Drawing Sheets

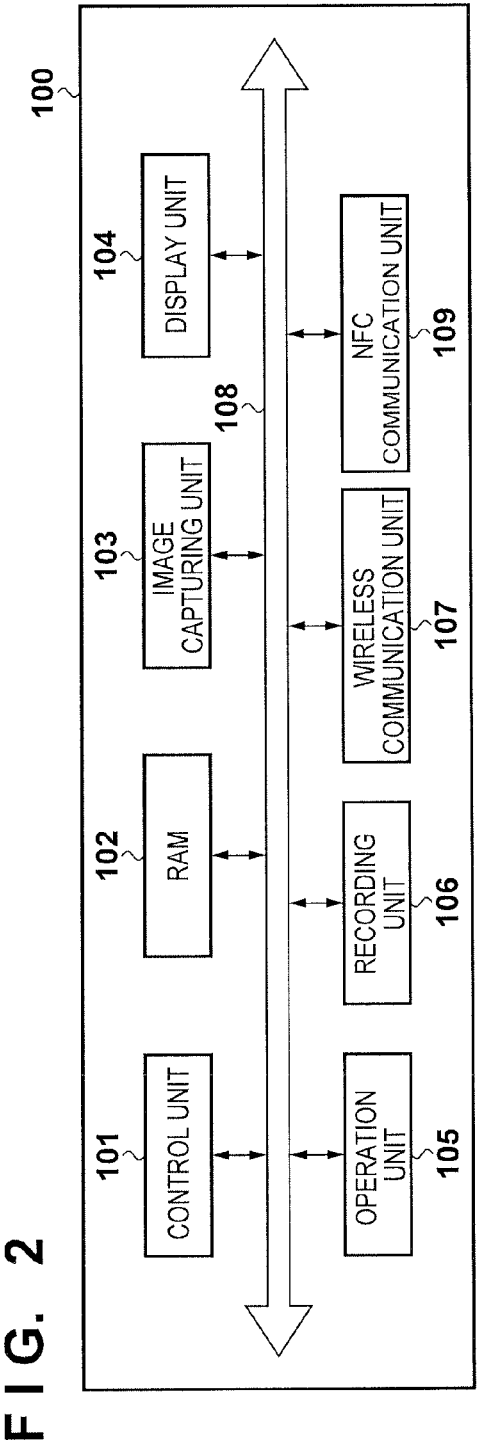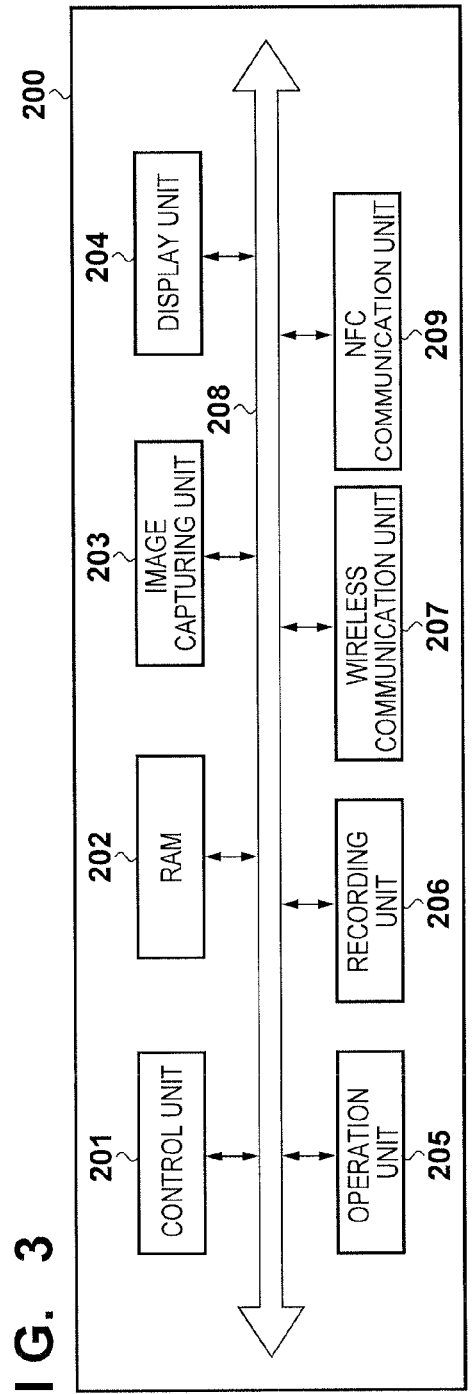

COMMUNICATION APPARATUS AND CONTROL METHOD THEREOF

BACKGROUND OF THE INVENTION

Field of the Invention

The present invention relates to a communication apparatus for contactlessly performing close proximity communication and a control method of the communication apparatus.

Description of the Related Art

In recent years, close proximity communication, which is wireless communication performed contactlessly within a short distance using an IC card or the like, has been used in electronic commuter tickets, electronic money, or the like, for example, and mobile phones having a function of an electronic commuter ticket or electronic money utilizing close proximity communication have become widespread.

There are communication standards for close proximity communication, such as ISO/IEC 14443 and ISO/IEC 18092 (hereinafter, NFC (Near Field Communication)) (Japanese Patent Laid-Open No. 2013-051717). Here, among communication apparatuses that perform close proximity communication conforming to the NFC standards or the like, an apparatus that outputs an RF (Radio Frequency) signal is called a reader/writer, and a communication apparatus such as an IC card or an IC chip that performs close proximity communication so as to respond to the signal from the reader/writer is called a tag.

A terminal having a reader/writer function reads out application activation information from an electronic device serving as the tag, and an application operating on the terminal can thereby be activated. However, in the present situation, since application activation information for each OS is different, there are cases where the application cannot be activated, depending on the terminal that reads out the application activation information. For example, in the case where the OS of a terminal is OS1 and the application activation information of a tag is for OS2, the terminal cannot activate the application even if the terminal reads out the application activation information of the tag.

SUMMARY OF THE INVENTION

The present invention has been made in consideration of the aforementioned problems, and enables an application to be activated on a terminal regardless of the OS type of the terminal.

In order to solve the aforementioned problems, the present invention provides a communication apparatus capable of close proximity wireless communication with a plurality of external apparatuses including a first external apparatus controlled by a first control program, and a second external apparatus controlled by a second control program of a type different from the first control program, the communication apparatus comprising: a holding unit configured to hold a plurality of pieces of activation information for activating an application; a reception unit configured to receive a request to acquire information held in the holding unit from the external apparatuses via the close proximity wireless communication; and a transmission unit configured to transmit the activation information held in the holding unit to the external apparatuses, in response to the request being received by the reception unit, wherein the transmission unit can transmit both first application activation information and second application activation information that are the activation information held in the holding unit to an external apparatus which has transmitted the request, regardless of whether the request received by the reception unit is a request from the first external apparatus or from the second external apparatus, and the first application activation information is defined by a format compatible with the first control program, and the second application activation information is defined by a format compatible with the second control program.

In order to solve the aforementioned problems, the present invention provides a communication apparatus capable of close proximity wireless communication with a plurality of external apparatuses including a first external apparatus controlled by a first control program, and a second external apparatus controlled by a second control program of a type different from the first control program, the communication apparatus comprising: a recording region that can be read out by the external apparatuses; and a recording unit configured to record, in the recording region, activation information for activating an application, wherein the recording unit records, in the recording region, both first application activation information defined by a format compatible with the first control program and second application activation information defined by a format compatible with the second control program, as the activation information.

In order to solve the aforementioned problems, the present invention provides a control method of a communication apparatus capable of close proximity wireless communication with a plurality of external apparatuses including a first external apparatus controlled by a first control program, and a second external apparatus controlled by a second control program of a type different from the first control program, the method comprising: holding a plurality of pieces of activation information for activating an application; receiving a request to acquire the held information from the external apparatuses via the close proximity wireless communication; and transmitting the held activation information to the external apparatuses in response to the request being received, wherein, regardless of whether the received request is a request from the first external apparatus or from the second external apparatus, both first application activation information and second application activation information that are the held activation information are transmitted to an external apparatus which has transmitted the request, and the first application activation information is defined by a format compatible with the first control program, and the second application activation information is defined by a format compatible with the second control program.

In order to solve the aforementioned problems, the present invention provides a control method of a communication apparatus capable of close proximity wireless communication with a plurality of external apparatuses including a first external apparatus controlled by a first control program, and a second external apparatus controlled by a second control program of a type different from the first control program, the method comprising: recording activation information for activating an application, in a recording region that can be read out by the external apparatuses, wherein both first application activation information defined by a format compatible with the first control program and second application activation information defined by a format compatible with the second control program are recorded as the activation information in the recording region.

According to the present invention, it is possible to activate an application on a terminal by the terminal acquiring application activation information compatible with its OS from an electronic device, regardless of the OS type of the terminal.

Further features of the present invention will become apparent from the following description of exemplary embodiments (with reference to the attached drawings).

BRIEF DESCRIPTION OF THE DRAWINGS

FIG. 2 is a diagram showing an exemplary configuration of a digital camera in the present embodiment.

FIG. 3 is a diagram showing an exemplary configuration of a smartphone in the present embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments.

First Embodiment

Hereinafter, a description will be given of a system in which a digital camera and a smartphone, which is a type of mobile phone, are used respectively as an electronic device and a terminal in the present invention, and in which they contactlessly perform close proximity communication. Note that the system to which the present invention is applicable is not limited thereto. For example, exemplary electronic devices to which the present invention is applicable include IC cards, various media players, game machines, mobile phones, tablet devices, and the like. Exemplary terminals to which the present invention is applicable include terminals having an NFC reader/writer, such as personal computers, tablet devices, and card readers prepared in shops, for example.

System Configuration

Figure 1:
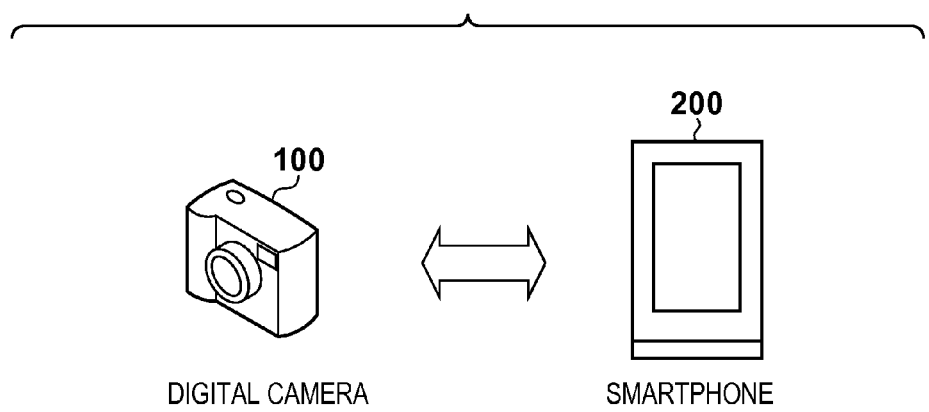
FIG. 1 is a diagram showing an exemplary system configuration in an embodiment according to the present invention.

First, a system configuration in the present embodiment will be described with reference to FIG. 1.

A system in the present embodiment is constituted by a digital camera 100 having an NFC tag function, and a smartphone 200 having an NFC reader/writer function. The smartphone 200 serving as an NFC reader/writer has an antenna, contactlessly performs close proximity communication with the digital camera 100 serving as an NFC tag by outputting an RF signal from the antenna, and reads out data from a memory incorporated in the digital camera 100.

The digital camera 100, upon approaching the smartphone 200, starts to operate by using, as a power source, the RF signal that is output by the smartphone 200 from the antenna thereof, and performs close proximity communication with the smartphone 200.

During close proximity communication, the smartphone 200 modulates the RF signal in accordance with data and thereby transmits the data, and the digital camera 100 receives the data transmitted by the smartphone 200 using the RF signal and writes it in the incorporated memory.

The digital camera 100 also reads out data stored in the memory, performs load modulation on the RF signal transmitted from the smartphone 200, and thereby transmits the data to the smartphone 200.

Configuration of Digital Camera

Next, a configuration and functions of the digital camera 100 constituting the system in the present embodiment will be described with reference to FIG. 2.

The digital camera 100 is an exemplary NFC tag device.

A control unit 101 includes a CPU and the like, and controls all blocks constituting the digital camera 100. A ROM for storing a program belongs to the control unit 101, and is not shown in the diagram.

A RAM 102 is a memory mainly used as a work area for the control unit 101 and a region for temporarily buffering data.

An image capturing unit 103 includes an optical lens, a CMOS sensor, an image processing circuit, and the like, performs photoelectric conversion on an object image that is caught via the optical lens to generate an analog signal, and generates image data by converting the obtained analog signal into a digital signal and performing various kinds of image processing thereon. Data of an image captured by the image capturing unit 103 is temporarily stored in the RAM 102, and is subjected to, for example, processing for recording the data in a recording medium performed by a recording unit 106, processing for transmitting the data to an external device performed by a wireless communication unit 107, and the like, based on a control instruction from the control unit 101. The image capturing unit 103 also includes a lens control unit, and performs processing such as zooming, focusing, and diaphragm adjustment, based on a control instruction from the control unit 101.

A display unit 104 is constituted by a liquid crystal panel, an organic EL panel, or the like, and displays an operation screen, a captured image, and the like, based on a control instruction from the control unit 101.

An operation unit 105 is constituted by buttons, a four-direction key, a touch panel, a remote controller, or the like, and accepts an instruction given by a user operation. Operation information that is input from the operation unit 105 is transmitted to the control unit 101, and the control unit 101 executes control of each unit, based on the operation information.

The recording unit 106 is constituted by a recording medium having a large capacity, and stores and reads out various kinds of data in/from the recording medium, based on a control instruction from the control unit 101. The recording medium is constituted by, for example, an incorporated flash memory, an incorporated hard disk, a removable memory card, or the like.

A wireless communication unit 107 includes hardware such as an antenna and a communication processing circuit, and performs wireless LAN communication conforming to the IEEE802.11n/a/g/b standard. The wireless communication unit 107 is connected to an external access point via a wireless LAN, and performs wireless LAN communication with other wireless communication devices via the access point.

An internal bus 108 is a bus for connecting the units in the digital camera 100 to each other.

An NFC communication unit 109 includes hardware such as an antenna, an RF circuit, a command sequencer, and a memory, and has an NFC tag function.

The antenna is constituted by, for example, a resonant circuit including a coil and a capacitor, receives an RF signal from an NFC reader/writer, and supplies it to the RF circuit.

The RF circuit performs close proximity communication with the reader/writer. That is to say, when the RF circuit approaches the reader/writer and an RF signal from the reader/writer is thereby received with the antenna, the RF circuit obtains electric power serving as a power source from the RF signal and supplies the electric power to necessary blocks. The RF circuit also demodulates the RF signal from the reader/writer into a command or data, and supplies it to the command sequencer. Furthermore, the RF circuit performs load modulation on the RF signal from the reader/writer in accordance with data supplied from the command sequencer, and thereby transmits the data to the reader/writer.

The command sequencer performs sequence control in accordance with a command that is transmitted from the reader/writer and is supplied from the RF circuit, and thereby controls reading and writing of data from/into the memory and the like. That is to say, if a command from the reader/writer is a write command that requests writing of data, the command sequencer writes, in the memory, the data that is transmitted together with this write command from the reader/writer and is supplied from the RF circuit. If a command from the reader/writer is a read command that requests reading of data, the command sequencer reads out data from the memory and supplies it to the RF circuit. The memory is a nonvolatile memory such as a flash memory, for example, and stores data in accordance with control performed by the command sequencer. The control unit 101 can perform reading from and writing into the memory of the NFC communication unit 109.

Configuration of Smartphone

A configuration and functions of the smartphone 200 constituting the system in the present embodiment will be described with reference to FIG. 3.

The smartphone 200 is an exemplary NFC reader/writer device in the present invention.

A control unit 201 includes a CPU and the like, and controls all blocks constituting the smartphone 200. A ROM for storing a program belongs to the control unit 201, and is not shown in the diagram.

A RAM 202 is a memory mainly used as a work area for the control unit 201 and a region for temporarily buffering data. The OS (Operation System), an application program, and the like are deployed in the RAM 202 and are executed by the control unit 201.

An image capturing unit 203, a display unit 204, an operation unit 205, a recording unit 206, a wireless communication unit 207, and an internal bus 208 have functions that are respectively similar to the image capturing unit 103, the display unit 104, the operation unit 105, the recording unit 106, the wireless communication unit 107, and the internal bus 108 in the digital camera 100, and accordingly will not be described.

An NFC communication unit 209 includes an antenna and the like, and has an NFC reader/writer function. The NFC communication unit 209 outputs an RF signal from the antenna, thereby contactlessly performs close proximity communication with the NFC tag (digital camera 100), writes data into the memory incorporated in the NFC tag (digital camera 100), and reads out data from the NFC tag.

Combinations of smartphone OSes and applications

Figure 4:
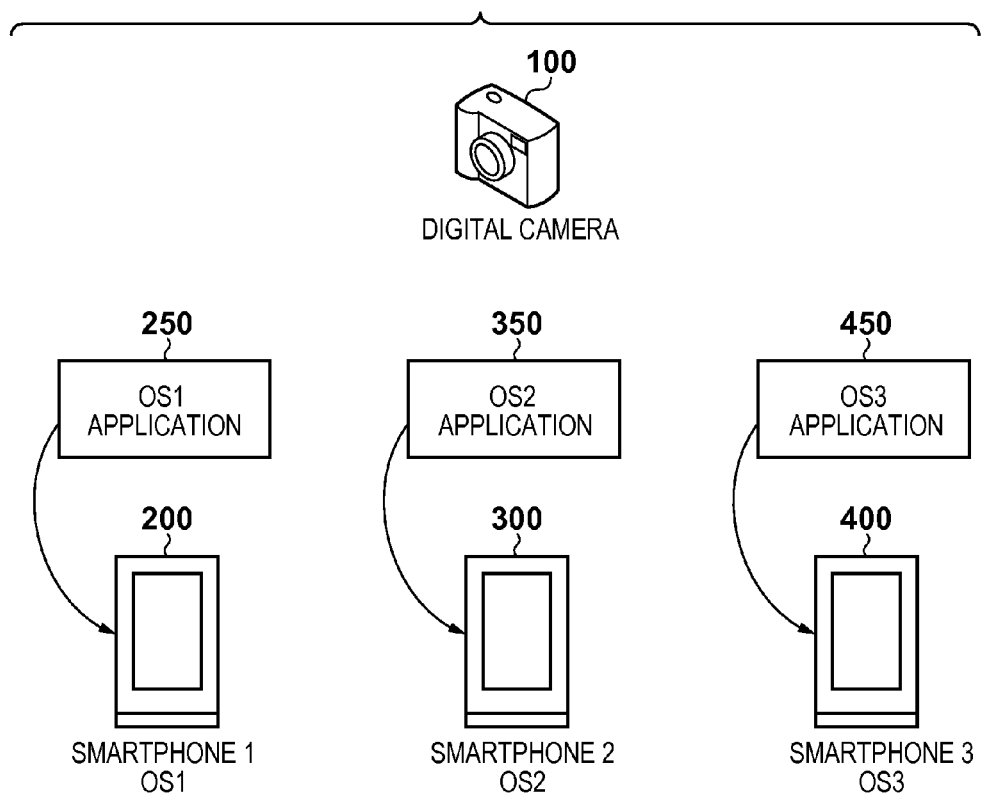
FIG. 4 is a diagram showing exemplary combinations of smartphone OSes and applications in the present embodiment.

Next, combinations of OSes of smartphones 200, 300, and 400 and applications that operate on the respective OSes in the present embodiment will be described with reference to FIG. 4.

In the smartphone 200, an OS1 deployed in the RAM 202 is executed, and only an OS1 application 250 can be executed in smartphones in which the OS1 is executed. Similarly, in the smartphone 300, an OS2 deployed in the RAM is executed, and only an OS2 application 350 can be executed in smartphones in which the OS2 is executed. Similarly, in the smartphone 400, an OS3 deployed in the RAM is executed, and only an OS3 application 450 can be executed in smartphones in which the OS3 is executed. That is to say, the OS1 application 250 cannot be activated on the OS2 operating in the smartphone 300, or on the OS3 operating in the smartphone 400. In order that an application is activated on each OS, application activation information for the OS is necessary.

For example, the OS1 is the Windows (registered trademark) OS provided by Microsoft, the OS2 is Android (registered trademark) OS, and the OS3 is iOS (registered trademark) provided by Apple.

The NFC tag stores the application activation information that defines an identical application using a plurality of formats.

The smartphones 200, 300, and 400 read out specific application activation information compatible with the OSes of the respective smartphones from the NFC tag of the digital camera 100, using the NFC reader/writer of the smartphones. The smartphones 200, 300, and 400 can then activate the application compatible with the OSes of the respective smartphone, using the application activation information that is read out from the NFC tag of the digital camera 100.

Note that, in the case of a tag having an electronic money function such as Suica (registered trademark), a common electronic money application is activated, and accordingly a reader/writer for reading out a tag will not activate different applications as in the present embodiment.

Configuration of NFC Tag

Next, a configuration of the NFC tag stored in the memory of the NFC communication unit 109 in the digital camera 100 in the present embodiment will be described with reference to FIG. 5.

Types 1, 2, 3, and 4 are standardized as RTD (Record Type Definition) for NFC tags by NFC (Near Field Communication) Forum. Although the present embodiment will describe an example using a Type 4 tag, the present invention is also applicable to tags of Types 1, 2, and 3.

In a Type 4 tag, an NDEF (NFC Data Exchange Format) file is stored at a memory address E104.

NDEF is an NFC data format standardized by NFC Forum.

Leading two bytes of an NDEF file form an NLEN field 500, which indicates the length of an NDEF message that follows the NLEN field.

The NDEF message is constituted by four NDEF records, namely NDEF records 501, 502, 503, and 504.

Each NDEF record is constituted by an NDEF header, a type, and a payload.

The NDEF header includes a flag indicating the beginning or the end of the message, the payload length, and the like.

The type of the NDEF record 501 is an ASCII code of a character string "OS1.com/LaunchApp", and includes information of a compatible OS. The payload of the NDEF record 501 is an ASCII code of a character string "CameraApp", and indicates the name of an application to be activated.

The type of the NDEF record 502 is an ASCII code of a character string indicating an application package "OS2.com: pkg", and includes information of a compatible OS. The payload of the NDEF record 502 is an ASCII code of a character string "CameraApp Ver3", and indicates information of the name of an application to be activated and a version thereof.

The type of the NDEF record 503 is an ASCII code of a character string indicating an application package "OS2.com: pkg", and includes information of a compatible OS. The payload of the NDEF record 503 is an ASCII code of a character string "CameraApp Ver2", and indicates information of the name of an application to be activated and a version thereof.

The type of the NDEF record 504 is an ASCII code of a character string indicating an application package "OS2.com: pkg", and includes information of a compatible OS. The payload of the NDEF record 504 is an ASCII code of a character string "CameraApp Ver1", and indicates information of the name of an application to be activated and a version thereof.

Figure 5:
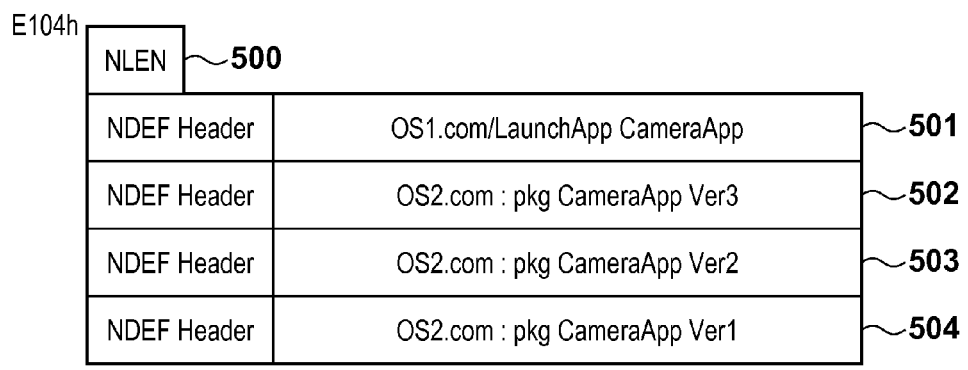
FIG. 5 is a diagram showing an exemplary configuration of an NFC tag in the present embodiment.

Note that the type and the payload of each NDEF record stored in the memory of the NFC communication unit 109 in the digital camera 100 in the present embodiment are not limited to the example in FIG. 5. For example, the type and the payload of the NDEF record may include information of a service access point defined by NFC forum. The payload of each NDEF record may include information indicating a more detailed application path.

Tag Readout Sequence

Next, a sequence by which the NFC reader/writer of the smartphone 200 reads out data from the NFC tag of the digital camera 100 will be described with reference to FIG. 6. Note that, although the present embodiment will describe an example using a Type 4 tag operation, the present invention is also applicable to tag operations of Types 1, 2, and 3.

In step S601, the reader/writer 200 transmits a command C-APDU (Application Protocol Data Unit) generated by the control unit 201, from the NFC communication unit 209 to the NFC communication unit 109 of the tag (digital camera 100). C-APDU is a data format defined by ISO/IEC7816, and is used as a command for a tag. To read and write data from/into a Type 4 tag, three types of C-APDU, namely a Select command, a ReadBinary command, and an Update command are used. Note that NFC communication between the reader/writer 200 and the tag 100 can be realized using a common format by conforming to C-APDU, regardless of difference in the OS.

In step S601, the reader/writer (smartphone 200) transmits a Select command and designates the NDEF file stored at the memory address E104h in the tag (digital camera 100).

In step S602, the tag (digital camera 100) replies a response R-APDU as a reply to the C-APDU (Select).

In step S603, the reader/writer (smartphone 200) transmits a ReadBinary command for the NDEF file designated by the Select command, and reads out the NLEN field, which is the leading two bytes of the NDEF file of the tag (digital camera 100).

In step S604, the tag (digital camera 100) replies a response R-APDU as a reply to the C-APDU (ReadBinary).

In step S605, the reader/writer (smartphone 200) transmits a ReadBinary command for the NDEF file designated by the Select command, and reads out the NDEF message of the NDEF file of the tag (digital camera 100) by NLEN, which is the length of the NDEF message.

In step S606, the tag (digital camera 100) replies a response R-APDU as a reply to the C-APDU (ReadBinary).

The reader/writer (smart phone 200) may repeat, in step S607, the sequence from step S601 to repeat readout of the tag (digital camera 100).

Communication Processing in Digital Camera

Communication processing at the NFC tag of the digital camera 100 in the present embodiment will be described with reference to FIG. 7.

Figure 7:
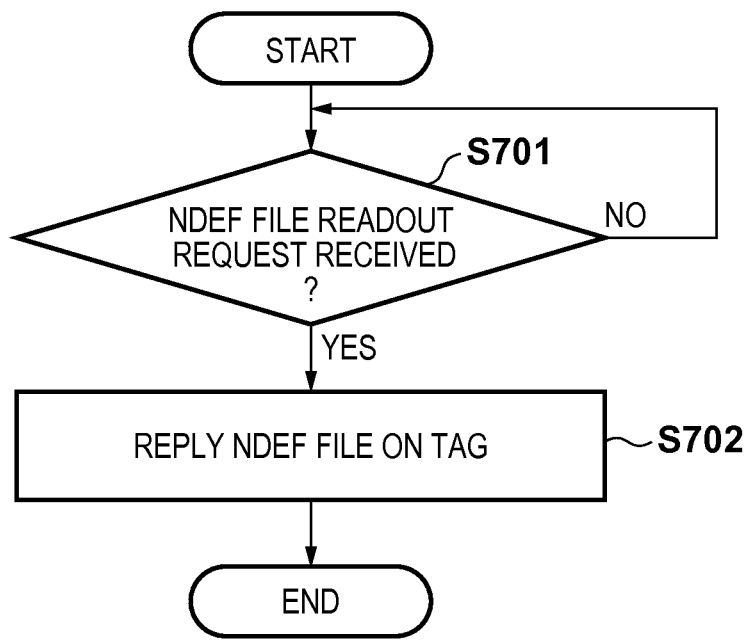
FIG. 7 is a flowchart showing communication processing performed by a digital camera in a first embodiment.

Processing in FIG. 7 is started by the NFC communication unit 109 in the digital camera 100 receiving the RF signal from the NFC communication unit 209 in the smartphone 200.

Figure 6:
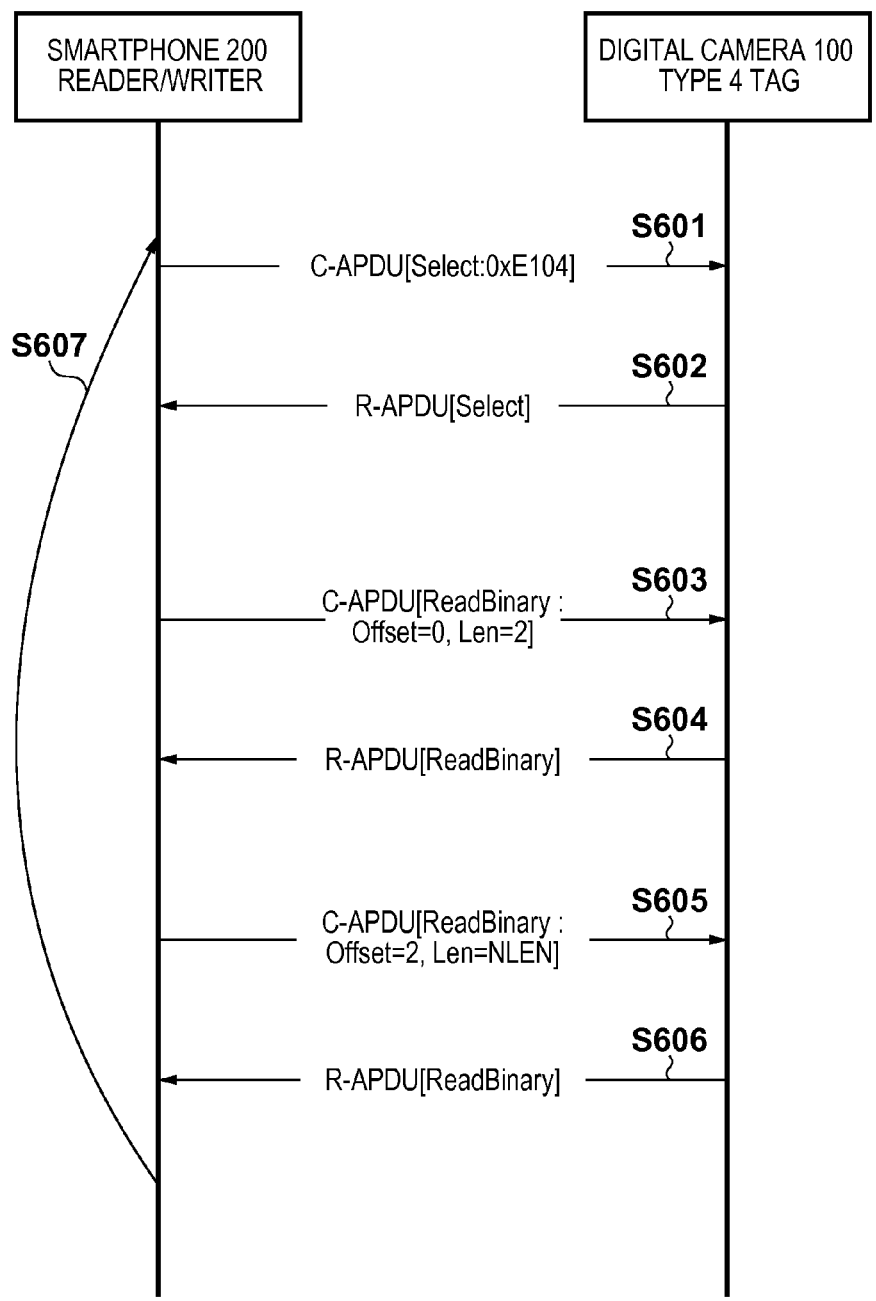
FIG. 6 is a diagram showing a tag readout sequence performed by the digital camera and the smartphone in the present embodiment.

In step S701, upon the NFC communication unit 109 receiving, from the smartphone 200, the command C-APDU (ReadBinary), which is an NDEF file readout request (acquisition request) described in FIG. 6, the processing proceeds to step S702.

In step S702, the NFC communication unit 109 replies the response R-APDU (ReadBinary) described in FIG. 6, and thereby transmits the NDEF message (FIG. 5) stored in the memory of the NFC communication unit 109 to the smartphone 200.

Communication Processing in Smartphone

Communication processing at the NFC reader/writer of the smartphone 200 in the present embodiment will be described with reference to FIG. 8.

Figure 8:
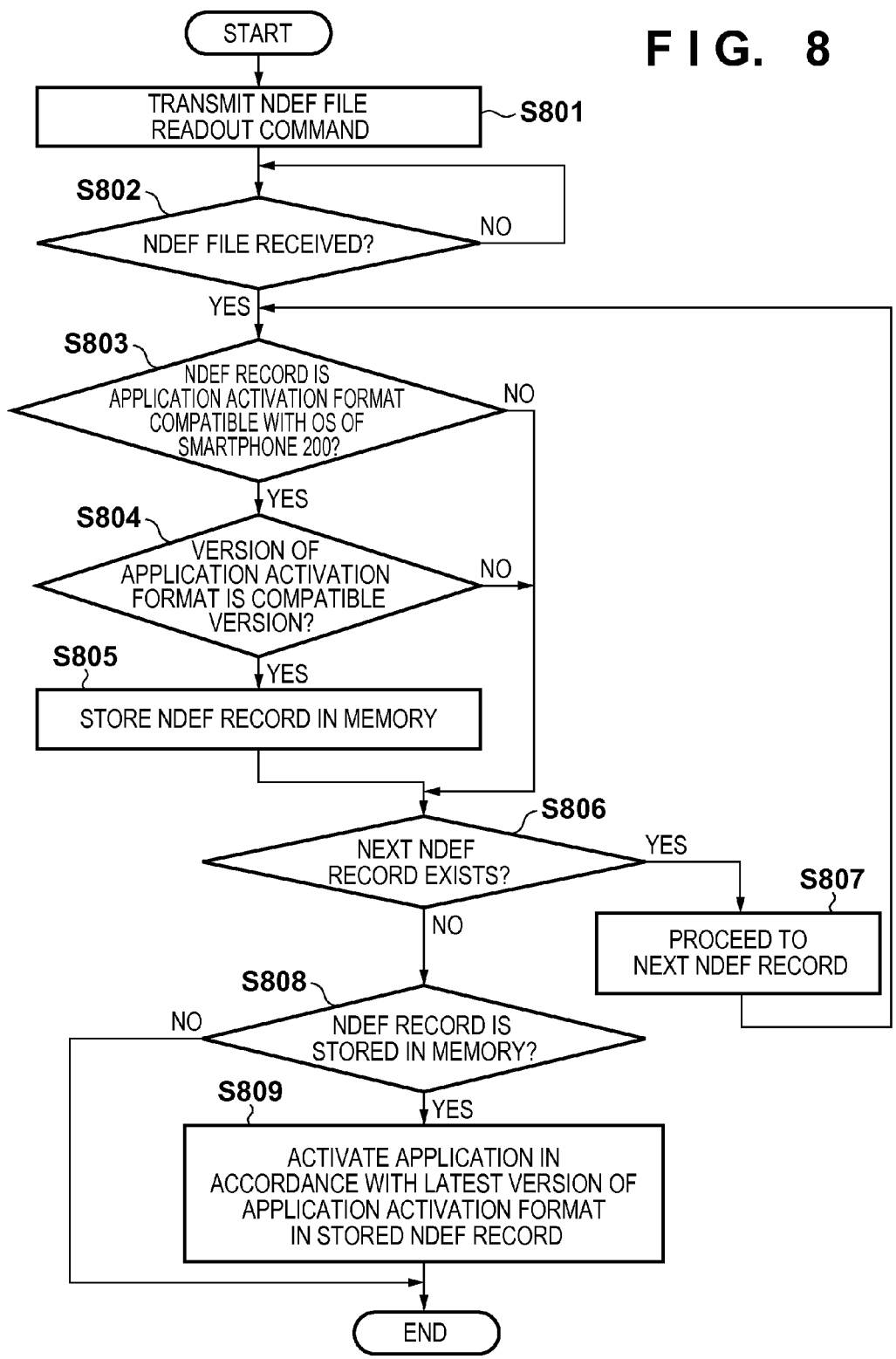
FIG. 8 is a flowchart showing communication processing performed by a smartphone in the first embodiment.

Processing in FIG. 8 is started by the NFC communication unit 209 in the smartphone 200 outputting the RF signal from the antenna.

In step S801, the NFC communication unit 209 transmits, to the digital camera 100, the command C-APDU (ReadBinary), which is an NDEF file readout request described in FIG. 6.

In step S802, upon the NFC communication unit 209 receiving the response R-APDU (ReadBinary) described in FIG. 6 from the digital camera 100, the control unit 201 checks that the NDEF message is contained in the R-APDU (ReadBinary). If the control unit 201 receives the NDEF message from the digital camera 100, the processing proceeds to step S803.

In step S803, the control unit 201 decodes the NDEF message received from the digital camera 100 for each NDEF record in order. The control unit 201 decodes the first NDEF record (in FIG. 5, the NDEF record 501), and determines whether or not the content of the type and the payload indicates an application activation format compatible with the OS executed by the smartphone 200. For example, assume that the NDEF message received from the digital camera 100 has the content shown in FIG. 5, and the OS executed by the smartphone 200 is the OS1. In this case, it is determined that the NDEF record 501 has the application activation format compatible with the smartphone 200, and the processing proceeds to step S804. Also assume that the NDEF message received from the digital camera 100 has the content shown in FIG. 5, and the OS executed by the smartphone 200 is the OS2. In this case, it is determined that the NDEF record 501 does not have an application activation format compatible with the smartphone 200, and the processing proceeds to step S806.

Note that, when determining in step S803 whether or not the NDEF record has an application activation format compatible with the smartphone 200, not only the OS type but also application package information, application path information, service access point information, and the like that are contained in the type and the payload are considered.

In step S804, the control unit 201 determines whether or not each NDEF record of the NDEF message received from the digital camera 100 is a version compatible with the OS executed by the smartphone 200. For example, in the case of the NDEF record 501 in FIG. 5, since version information is not contained, it is determined that the NDEF record is a version compatible with the OS executed by the smartphone 200, and the processing proceeds to step S805. Furthermore, if the version compatible with the OS executed by the smartphone 200 is Ver2 or later, it is determined that the NDEF records 502 and 503 in FIG. 5 are compatible versions, and the processing proceeds to step S805. It is determined that the NDEF record 504 in FIG. 5 is not a compatible version, and the processing proceeds to step S806.

In step S805, the control unit 201 stores, in the RAM 202, an NDEF record that satisfies the conditions in steps S803 and S804 among the decoded NDEF records, and the processing proceeds to step S806.

In step S806, the control unit 201 determines whether or not the next NDEF record (in FIG. 5, the next of the NDEF record 501 is the NDEF record 502) exists, the processing proceeds to step S807 if exists, and the processing proceeds to step S808 if not.

In step S807, the control unit 201 proceeds to the next NDEF record (in FIG. 5, the next of the NDEF record 501 is the NDEF record 502), and in step S803, the control unit 201 decodes the next NDEF record.

In step S808, after decoding all NDEF records of the NDEF message received from the digital camera 100, the control unit 201 determines whether or not there is any NDEF record stored in the RAM 202 in step S805, and if any, the processing proceeds to step S809.

In step S809, the control unit 201 activates a corresponding application in accordance with the application activation format of the latest version in the NDEF records stored in the RAM 202 in step S805. For example, consider the case where the NDEF message received from the digital camera 100 has the content shown in FIG. 5, and the OS executed by the smartphone 200 is the OS1. In this case, the NDEF record to be stored in the RAM 202 is only the NDEF record 501. The smartphone 200 activates CameraApp, which is an OS1 application. Also consider the case where the NDEF message received from the digital camera 100 has the content shown in FIG. 5, the OS executed by the smartphone 200 is the OS2, and the version compatible with the OS2 is Ver2 or later. In this case, two NDEF records, namely the NDEF records 502 and 503 are stored in the RAM 202. The smartphone 200 activates the CameraAppVer3 application, which is Ver3, i.e., the latest version for the OS2, in accordance with the NDEF record 502.

As described above, in the present embodiment, information compatible with a plurality of OSes is described in the NDEF file. With this configuration, it is possible to enable communication with a plurality of smartphones having different OSes.

Second Embodiment

Figure 9:
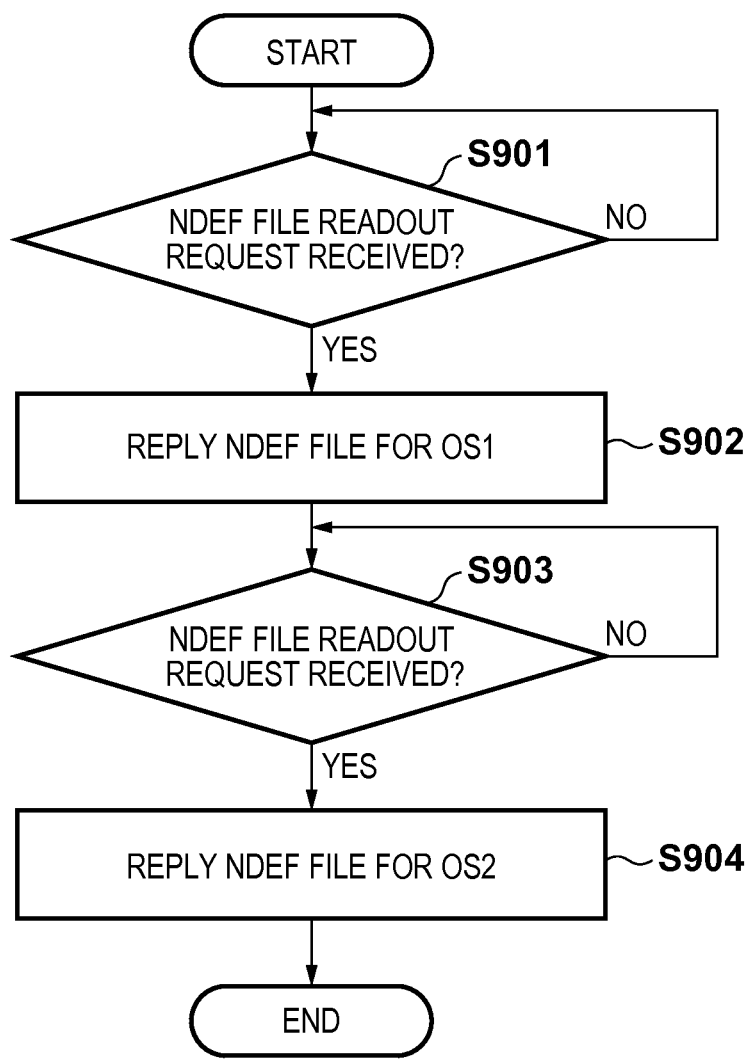
FIG. 9 is a flowchart showing communication processing performed by a digital camera in a second embodiment.

Next, a second embodiment will be described with reference to FIGS. 9 and 10.

In the following description, the part that overlaps the first embodiment will not be described, and the characteristic part of the second embodiment will be described in detail.

Firstly, communication processing performed by the NFC tag of the digital camera 100 in the second embodiment will be described with reference to FIG. 9. Processing in FIG. 9 is started by the NFC communication unit 109 in the digital camera 100 receiving the RF signal from the NFC communication unit 209 in the smartphone 200.

In step S901, upon the NFC communication unit 109 receiving, from the smartphone 200, the command C-APDU (ReadBinary), which is an NDEF file readout request (acquisition request) described in FIG. 6, the processing proceeds to step S902.

In step S902, the NFC communication unit 109 replies the response R-APDU (ReadBinary) described in FIG. 6, and thereby transmits the NDEF message stored in the memory of the NFC communication unit 109 to the smartphone 200. Here, the control unit 101 stores only the NDEF record 501 in FIG. 5, which has an OS1 application activation format, in the memory of the NFC communication unit 109. That is to say, the NFC communication unit 109 replies only the NLEN 500 and the NDEF record 501 to the smartphone 200.

In step S903, upon the NFC communication unit 109 again receiving, from the identical smartphone 200, the command C-APDU (ReadBinary), which is an NDEF file readout request described in FIG. 6, the processing proceeds to step S904. The NDEF file readout request command that is received again is transmitted when the smartphone 200 is not compatible with the OS1. That is to say, when the digital camera 100 again receives the NDEF file readout request command, it can be presumed that the smartphone 200 is not compatible with the OS1.

In step S904, the NFC communication unit 109 replies the response R-APDU (ReadBinary) described in FIG. 6, and thereby transmits the NDEF message stored in the memory of the NFC communication unit 109 to the smartphone 200. The control unit 101 deletes, from the memory of the NFC communication unit 109, the NDEF record 501 in FIG. 5, which has an OS1 application activation format, and newly stores the NDEF records 502, 503, and 504 in FIG. 5, which have an OS2 application activation format. That is to say, the NFC communication unit 109 replies the NLEN 500 and the NDEF records 502, 503, and 504 to the smartphone 200. In other words, in response to the second NDEF file readout request command, the NFC communication unit 109 notifies the smartphone 200 of compatibility with an OS different from the OS described in the first reply. As mentioned above, this is because, when the NDEF file readout request command is received again, it is presumed that the smartphone 200 is not compatible with the OS1.

Next, communication processing performed by the NFC reader/writer of the smartphone 200 in the second embodiment will be described with reference to FIG. 10.

Figure 10:
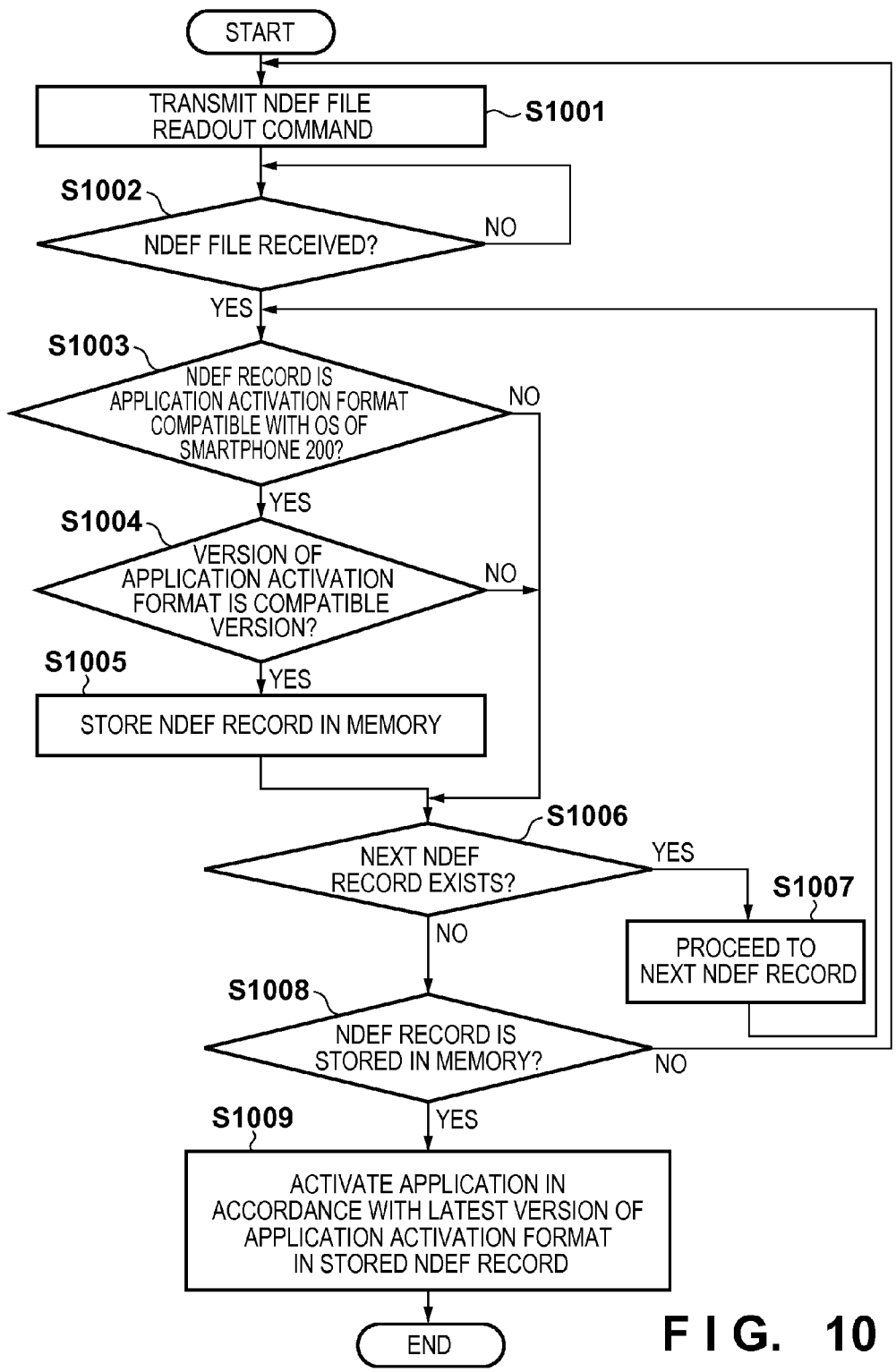
FIG. 10 is a flowchart showing communication processing performed by a smartphone in the second embodiment.

Processing in FIG. 10 is started by the NFC communication unit 209 in the smartphone 200 outputting the RF signal from the antenna.

In step S1001, the NFC communication unit 209 transmits, to the digital camera 100, the command C-APDU (ReadBinary), which is an NDEF file readout request (acquisition request) described in FIG. 6, and the processing proceeds to step S1002.

In step S1002, upon the NFC communication unit 209 receiving the response R-APDU (ReadBinary) described in FIG. 6 from the digital camera 100, the control unit 201 checks that the NDEF message is contained in the R-APDU (ReadBinary).

In step S1002, if the control unit 201 receives the NDEF message from the digital camera 100, the processing proceeds to step S1003.

In step S1003, the control unit 201 decodes the NDEF message received from the digital camera 100 for each NDEF record in order. The control unit 201 decodes the first NDEF record (in FIG. 5, the NDEF record 501), and determines whether or not the content of the type and the payload indicates an application activation format compatible with the OS executed by the smartphone 200. As described in FIG. 9, in the present embodiment, the NDEF message received first from the digital camera 100 has the content shown in the NDEF record 501 in FIG. 5. If the OS executed by the smartphone 200 is the OS1, it is determined that the NDEF record 501 has an application activation format compatible with the smartphone 200, and the processing proceeds to step S1004. Also assume that the OS executed by the smartphone 200 is the OS2. In this case, it is determined that the NDEF record 501 does not have an application activation format compatible with the smartphone 200, and the processing proceeds to step S1006.

Note that, when determining in step S1003 whether or not the NDEF record has an application activation format compatible with the smartphone 200, not only the OS type but also application package information, application path information, service access point information, and the like that are contained in the type and the payload are considered.

In step S1004, the control unit 201 determines whether or not each NDEF record of the NDEF message received from the digital camera 100 is a version compatible with the OS executed by the smartphone 200. For example, in the case of the NDEF record 501 in FIG. 5, since version information is not contained, it is determined that the NDEF record is a version compatible with the OS executed by the smartphone 200, and the processing proceeds to step S1005. Furthermore, if the version compatible with the OS executed by the smartphone 200 is Ver2 or later, it is determined that the NDEF records 502 and 503 in FIG. 5 are compatible versions, and the processing proceeds to step S1005. It is determined that the NDEF record 504 in FIG. 5 is not a compatible version, and the processing proceeds to step S1006.

In step S1005, the control unit 201 stores, in the RAM 202, an NDEF record that satisfies the conditions in steps S1003 and S1004 among the decoded NDEF records, and the processing proceeds to step S1006.

In step S1006, the control unit 201 determines whether or not the next NDEF record (in FIG. 5, the next of the NDEF record 501 is the NDEF record 502) exists, the processing proceeds to step S1007 if exists, and the processing proceeds to step S1008 if not. Note that, since the digital camera 100 in the present embodiment initially describes only the NDEF record 501, the determination result in this step is NO.

In step S1007, the control unit 201 proceeds to the next NDEF record (in FIG. 5, the next of the NDEF record 501 is the NDEF record 502), and in step S1003, the control unit 201 decodes the next NDEF record.

In step S1008, the control unit 201 decodes all NDEF records of the NDEF message received from the digital camera 100, and thereafter determines whether or not there is any NDEF record stored in the RAM 202 in step S1005. If there is any NDEF record according to the determination result, the processing proceeds to step S1009, and if not, the processing returns to step S1001. That is to say, if an application activation format compatible with the OS of the smartphone 200 does not exist in the NDEF message received from the digital camera 100 at the first time, the NDEF file readout request command is retransmitted to the identical digital camera 100. The NDEF file readout request command that is retransmitted here is received again by the digital camera 100 in step S903. Then, as described above, the digital camera 100 deletes the NDEF record 501, and newly stores the NDEF records 502, 503, and 504 in FIG. 5 that have an OS2 application activation format. Thereafter, the smartphone 200 performs processing in steps S1002 to S1008 on the NDEF records 502, 503, and 504.

In step S1009, the control unit 201 activates a corresponding application in accordance with the application activation format of the latest version in the NDEF records stored in the RAM 202 in step S1005. For example, if the NDEF message received from the digital camera 100 at the first time has the content indicated in the NDEF record 501 in FIG. 5, and the OS of the smartphone 200 is the OS1, the smartphone 200 activates CameraApp, which is an OS1 application.

The flow of FIG. 10 will now be described again. For example, consider the case where the NDEF message received from the digital camera 100 at the first time has the content indicated in the NDEF record 501 in FIG. 5, the OS executed by the smartphone 200 is the OS2, and the version compatible with the OS2 is Ver2 or later. In this case, the processing in FIG. 10 returns from step S1008 to step S1001. The NFC communication unit 209 then retransmits the NDEF file readout request command to the identical digital camera 100.

The NDEF message received from the digital camera 100 at the second time has the content indicated in the NDEF records 502, 503, and 504 in FIG. 5. In this case, the smartphone 200 activates the CameraAppVer3 application, which is Ver3, i.e., the latest version for the OS2, in accordance with the NDEF record 502.

According to the above-described embodiments, by an NFC reader/writer of a smartphone reading out application activation information compatible with each OS from an NFC tag of a digital camera, an application can be activated in each smartphone regardless of the OS type of the smartphone.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-254488, filed Dec. 9, 2013 which is hereby incorporated by reference herein in its entirety.

What is claimed is:

1. A communication apparatus capable of close proximity wireless communication with a plurality of external apparatuses including a first external apparatus controlled by a first control program, and a second external apparatus controlled by a second control program of a type different from the first control program, the communication apparatus comprising:
   a holding unit configured to hold a plurality of pieces of activation information for activating an application;
   a reception unit configured to receive a request to acquire information held in the holding unit from the external apparatuses via the close proximity wireless communication; and
   a transmission unit configured to transmit the activation information held in the holding unit to the external apparatuses, in response to the request being received by the reception unit, wherein the transmission unit can transmit both first application activation information and second application activation information that are the activation information held in the holding unit to an external apparatus which has transmitted the request, regardless of whether the request received by the reception unit is a request from the first external apparatus or from the second external apparatus, and the first application activation information is defined by a format compatible with the first control program, and the second application activation information is defined by a format compatible with the second control program.

2. The apparatus according to claim 1, wherein a request received from the first external apparatus and a request received from the second external apparatus have an identical format.

3. The apparatus according to claim 1, wherein the transmission unit transmits the first application activation information, regardless of whether the request received by the reception unit is a request from the first external apparatus or from the second external apparatus, and the transmission unit transmits the second application activation information in response to a re-request being received from the external apparatuses.

4. The apparatus according to claim 1, wherein the transmission unit operates using electric power based on a signal from the external apparatuses.

5. The apparatus according to claim 1, further comprising an NFC tag including a holding unit, a reception unit, and a transmission unit, wherein the request is transmitted from a reader/writer installed in each of the external apparatuses.

6. The apparatus according to claim 1, wherein the first application activation information and the second application activation information contain a common character string indicating an application.

7. The apparatus according to claim 1, further comprising an image capturing unit configured to capture an image of an object and generate image data.

8. A communication apparatus capable of close proximity wireless communication with a plurality of external apparatuses including a first external apparatus controlled by a first control program, and a second external apparatus controlled by a second control program of a type different from the first control program, the communication apparatus comprising:
   a recording region that can be read out by the external apparatuses; and
   a recording unit configured to record, in the recording region, activation information for activating an application,
   wherein the recording unit records, in the recording region, both first application activation information defined by a format compatible with the first control program and second application activation information defined by a format compatible with the second control program, as the activation information,
   wherein when a request from the first external apparatus is received, both the first application activation information and the second application activation information are transmitted to the first external apparatus,
   wherein when a request from the second external apparatus is received, both the first application activation information and the second application activation information are transmitted to the second external apparatus.

9. The apparatus according to claim 8, wherein the request received from the first external apparatus and the request received from the second external apparatus have an identical format.

10. The apparatus according to claim 8, wherein the transmission of both the first application activation information and the second application activation information is performed using electric power based on a signal from the external apparatuses.

11. The apparatus according to claim 8, wherein the recording region is an NFC tag, and the request is transmitted from an NFC reader/writer installed in each of the external apparatuses.

12. The apparatus according to claim 8, wherein the first application activation information and the second application activation information contain a common character string indicating an application.

13. The apparatus according to claim 8, further comprising an image capturing unit configured to capture an image of an object and generate image data.

14. A control method of a communication apparatus capable of close proximity wireless communication with a plurality of external apparatuses including a first external apparatus controlled by a first control program, and a second external apparatus controlled by a second control program of a type different from the first control program, the method comprising:
   holding a plurality of pieces of activation information for activating an application;
   receiving a request to acquire the held information from the external apparatuses via the close proximity wireless communication; and transmitting the held activation information to the external apparatuses in response to the request being received,
   wherein, regardless of whether the received request is a request from the first external apparatus or from the second external apparatus, both first application activation information and second application activation information that are the held activation information are transmitted to an external apparatus which has transmitted the request, and the first application activation information is defined by a format compatible with the first control program, and the second application activation information is defined by a format compatible with the second control program.

15. A control method of a communication apparatus capable of close proximity wireless communication with a plurality of external apparatuses including a first external apparatus controlled by a first control program, and a second external apparatus controlled by a second control program of a type different from the first control program, the method comprising:

recording activation information for activating an application, in a recording region that can be read out by the external apparatuses, wherein both first application activation information defined by a format compatible with the first control program and second application activation information defined by a format compatible with the second control program are recorded as the activation information in the recording region, wherein when a request from the first external apparatus is received, both the first application activation information and the second application activation information are transmitted to the first external apparatus, wherein when a request from the second external apparatus is received, both the first application activation information and the second application activation information are transmitted to the second external apparatus.

16. A non-transitory computer-readable storage medium which stores a program for causing a communication apparatus to execute a method, the communication apparatus being capable of close proximity wireless communication with a plurality of external apparatuses including a first external apparatus controlled by a first control program, and a second external apparatus controlled by a second control program of a type different from the first control program, the method comprising:

holding a plurality of pieces of activation information for activating an application;

receiving a request to acquire the held information from the external apparatuses via the close proximity wireless communication; and transmitting the held activation information to the external apparatuses in response to the request being received, wherein, regardless of whether the received request is a request from the first external apparatus or from the second external apparatus, both first application activation information and second application activation information that are the held activation information are transmitted to an external apparatus which has transmitted the request, and the first application activation information is defined by a format compatible with the first control program, and the second application activation information is defined by a format compatible with the second control program.

17. A non-transitory computer-readable storage medium which stores a program for causing a communication apparatus to execute a method, the communication apparatus being capable of close proximity wireless communication with a plurality of external apparatuses including a first external apparatus controlled by a first control program, and a second external apparatus controlled by a second control program of a type different from the first control program, the method comprising:

recording activation information for activating an application, in a recording region that can be read out by the external apparatuses, wherein both first application activation information defined by a format compatible with the first control program and second application activation information defined by a format compatible with the second control program are recorded as the activation information in the recording region, wherein when a request from the first external apparatus is received, both the first application activation information and the second application activation information are transmitted to the first external apparatus, wherein when a request from the second external apparatus is received, both the first application activation information and the second application activation information are transmitted to the second external apparatus.

* * * * *